US009894226B2

(12) United States Patent
Okazaki (10) Patent No.: US 9,894,226 B2
(45) Date of Patent: Feb. 13, 2018

(54) INFORMATION PROCESSING APPARATUS, SETTING CONDITION SPECIFICATION METHOD FOR IMAGE FORMING APPARATUS

(71) Applicant: KYOCERA Document Solutions Inc., Osaka-shi, Osaka (JP)

(72) Inventor: Yusuke Okazaki, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/197,529

(22) Filed: Jun. 29, 2016

(65) Prior Publication Data

US 2017/0006172 A1 Jan. 5, 2017

(30) Foreign Application Priority Data

Jun. 30, 2015 (JP) ................................. 2015-131859

(51) Int. Cl.
*H04N 1/00* (2006.01)
*G02B 27/01* (2006.01)
(Continued)

(52) U.S. Cl.
CPC ..... *H04N 1/00466* (2013.01); *G02B 27/0172* (2013.01); *G06F 3/011* (2013.01);
(Continued)

(58) Field of Classification Search
None
See application file for complete search history.

(56) References Cited

U.S. PATENT DOCUMENTS 9,096,920 B1* 8/2015 Gomez ................... C23C 4/06
348/78
2014/0023351 A1* 1/2014 Kaburlasos ........ H04N 21/4223
386/353
(Continued)

FOREIGN PATENT DOCUMENTS

JP        2003036069 A     2/2007
JP        2012216123 A    11/2012
(Continued)

*Primary Examiner* — Beniyam Menberu
(74) *Attorney, Agent, or Firm* — Alleman Hall Creasman & Tuttle LLP (57) ABSTRACT

An information processing apparatus can be worn by a user of an image forming apparatus, and includes a camera, a visual line detecting portion, a target image recognizing portion, a positional condition determining portion, and a wireless communication portion. The target image recognizing portion, when a positional condition among setting conditions for image-formation-related processes is specified, recognizes an image of a specification target that is included in a visual field image photographed by the camera, the specification target being a target of specification of the positional condition. The positional condition determining portion determines a specified positional condition based on a position in the image of the specification target recognized by the target image recognizing portion, the position corresponding to the visual line direction detected by the visual line detecting portion. The wireless communication portion wirelessly transmits information of the specified positional condition to the image forming apparatus.

1 Claim, 8 Drawing Sheets (51) Int. Cl.
*G06F 3/01* (2006.01)
*G06F 3/12* (2006.01)
*G06K 15/02* (2006.01)
*G06K 9/00* (2006.01)

(52) U.S. Cl.
CPC ............ *G06F 3/013* (2013.01); *G06F 3/1253* (2013.01); *G06K 9/00463* (2013.01); *H04N 1/0083* (2013.01); *H04N 1/00127* (2013.01); *H04N 1/00408* (2013.01); *G02B 2027/014* (2013.01); *G02B 2027/0138* (2013.01); *G02B 2027/0178* (2013.01); *H04N 2201/0094* (2013.01)

(56) References Cited

U.S. PATENT DOCUMENTS

| | | | | |
|---|---|---|---|---|
| 2014/0126018 | A1* | 5/2014 | Sugimoto | G06F 3/013 358/1.15 |
| 2014/0293329 | A1* | 10/2014 | Shimizu | G06F 3/1259 358/1.15 |
| 2014/0320914 | A1 | 10/2014 | Ishizu | |
| 2015/0138232 | A1* | 5/2015 | Sugimoto | G06F 3/1205 345/633 |
| 2015/0138595 | A1* | 5/2015 | Sugimoto | H04N 1/0044 358/1.15 |
| 2015/0227222 | A1* | 8/2015 | Sako | G06F 3/011 345/173 |
| 2015/0304790 | A1 | 10/2015 | Yamashita | |
| 2016/0026253 | A1* | 1/2016 | Bradski | G02B 27/225 345/8 |
| 2016/0219175 | A1* | 7/2016 | Uchida et al. | H04N 1/00896 |
| 2017/0289728 | A1 | 10/2017 | Yamashita | |

FOREIGN PATENT DOCUMENTS

| | | |
|---|---|---|
| JP | 2014116722 A | 6/2014 |
| JP | 2015102909 A | 6/2015 |

* cited by examiner

INFORMATION PROCESSING APPARATUS, SETTING CONDITION SPECIFICATION METHOD FOR IMAGE FORMING APPARATUS

INCORPORATION BY REFERENCE

This application is based upon and claims the benefit of priority from the corresponding Japanese Patent Application No. 2015-131859 filed on Jun. 30, 2015, the entire contents of which are incorporated herein by reference.

BACKGROUND

The present disclosure relates to an information processing apparatus worn by a user of an image forming apparatus, and relates to a setting condition specification method for an image forming apparatus.

In general, there is known a head mount device that is an information processing apparatus that can be worn by a user. In addition, a goggle-type head mount device may include an image display portion and a visual line detecting portion. The image display portion is supported in front of an eye of the user and configured to allow the user to visually recognize an image. The visual line detecting portion is configured to detect a visual line direction of the user. Furthermore, the head mount device may include a camera configured to photograph a visual field of the user.

SUMMARY

An information processing apparatus according to an aspect of the present disclosure is configured to be worn by a user of an image forming apparatus, and includes a camera, a visual line detecting portion, a target image recognizing portion, a positional condition determining portion, and a wireless communication portion. The camera is configured to photograph a visual field of the user. The visual line detecting portion is configured to detect a visual line direction of the user. The target image recognizing portion is configured to, when a positional condition among setting conditions for image-formation-related processes is specified, recognize an image of a specification target that is included in a visual field image photographed by the camera, the specification target being a target of specification of the positional condition. The positional condition determining portion is configured to determine a specified positional condition based on a position in the image of the specification target recognized by the target image recognizing portion, the position corresponding to the visual line direction detected by the visual line detecting portion. The wireless communication portion is configured to wirelessly transmit information of the specified positional condition to the image forming apparatus.

A setting condition specification method for an image forming apparatus according to another aspect of the present disclosure is a method for specifying setting conditions for image-formation-related processes by using an information processing apparatus including the camera and the visual line detecting portion. The setting condition specification method includes, when a positional condition among setting conditions for image-formation-related processes is specified, the information processing apparatus recognizing an image of a specification target that is included in a visual field image photographed by the camera, the specification target being a target of specification of the positional condition. The method further includes the information processing apparatus determining a specified positional condition based on a position in the recognized image of the specification target, the position corresponding to the detected visual line direction. The method further includes the information processing apparatus wirelessly transmitting information of the specified positional condition to the image forming apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the attached drawings. It should be noted that the following embodiments are examples of a specific embodiments of the present disclosure and should not limit the technical scope of the present disclosure.

First Embodiment: Image Forming Apparatus 10

Figure 1:
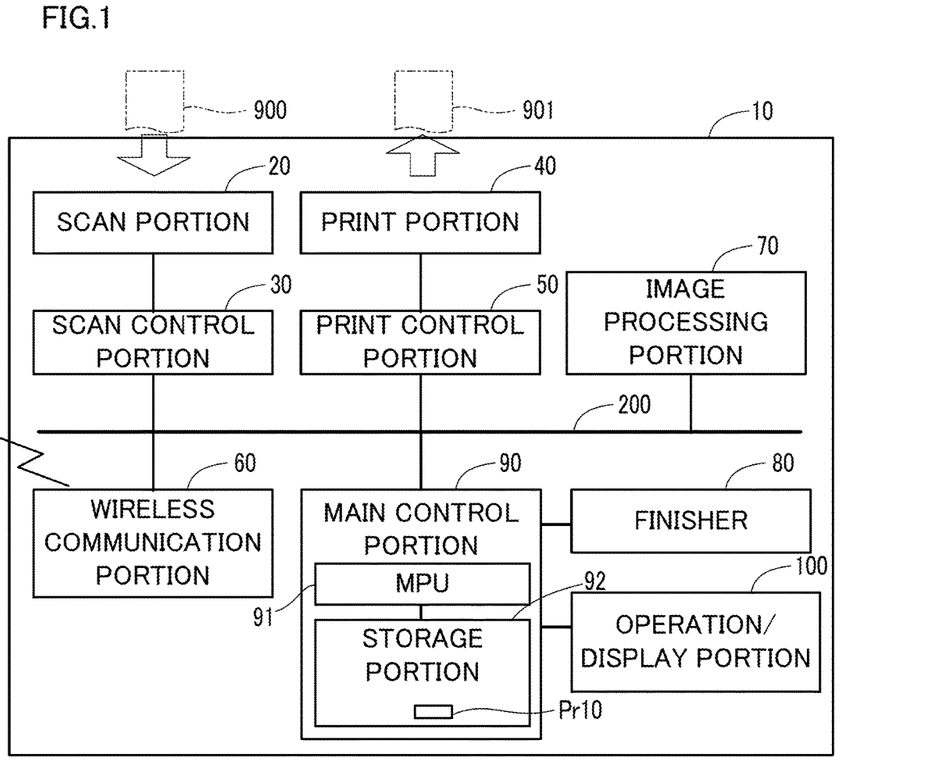
FIG. 1 is a block diagram of an image forming apparatus.

First, with reference to FIG. 1, a description is given of a configuration of an image forming apparatus 10 that can perform a communication with a head mount device 1 according to the present embodiment. The image forming apparatus 10 is configured to form an image on a sheet member 901 that is a sheet-like image recording medium.

The head mount device 1 shown in FIG. 1 is a multifunction peripheral having a function of an image reading device for reading an image from a document sheet 900, and a function of an image forming device for forming an image on the a sheet member 901. It is noted that the image forming apparatus 10 may be a facsimile apparatus that has also an image transmission function. It is noted that in FIG. 1, the document sheet 900 and the sheet member 901 are represented by an imaginary line (a two-dot chain line).

The image forming apparatus 10 includes a main control portion 90, an operation/display portion 100, a scan portion 20, a scan control portion 30, a print portion 40, a print control portion 50, a wireless communication portion 60, an image processing portion 70, and a finisher 80.

The main control portion 90, the scan control portion 30, the print control portion 50, the wireless communication portion 60 and the image processing portion 70 are connected to a bus 200, and can pass data to each other via the bus 200.

The scan portion 20 includes an optical system (not illustrated) for scanning the document sheet 900 with light, and an image sensor (not illustrated) for detecting, for each pixel, an amount of light reflected from the document sheet 900 and outputting document sheet image data.

The scan control portion 30 obtains the document sheet image data by controlling the scan portion 20. Furthermore, the scan control portion 30 transmits the document sheet image data to other devices including the image processing portion 70 via the bus 200.

The print portion 40 forms an image on a sheet member 901 in a well-known electrophotographic image forming process. The print portion 40 includes an image carrying member (not illustrated) and its peripheral devices, transfers an image of developer from the image carrying member to a sheet member 901, and fixes the image to the sheet member 901.

The print control portion 50 obtains recording image data from the image processing portion 70, and causes the print portion 40 to execute a process of forming an image on a sheet member 901 based on the recording image data.

The wireless communication portion 60 performs, through wireless signals, data transmissions/receptions with external apparatuses such as another image forming apparatus 10, a personal computer (not illustrated), and a head mount device 1 that is described below. As one example, the wireless communication portion 60 performs a wireless communication such as a Wi-Fi communication or a Bluetooth communication. It is noted that Wi-Fi is a registered trademark of Wi-Fi Affiance. In addition, Bluetooth is a registered trademark of Bluetooth SIG, Inc.

The wireless communication portion 60 also performs data transmissions/receptions with other devices via the bus 200. For example, the wireless communication portion 60 receives job data for image formation from an external apparatus, and transmits the job data to the image processing portion 70 via the bus 200.

The wireless communication portion 60 also has a function to obtain document sheet image data from the scan control portion 30 via the image processing portion 70, and transmit data including the document sheet image data to any of the external apparatuses. Furthermore, the wireless communication portion 60 has a function to obtain information on setting conditions regarding an image formation from the head mount device 1, and transmit the information to the main control portion 90.

The image processing portion 70 executes a variety of types of data processing on image data obtained from other devices via the bus 200. The target of the data processing performed by the image processing portion 70 is, for example, the document sheet image data obtained from the scan control portion 30, or job data obtained from an external apparatus via the wireless communication portion 60.

As one example, the image processing portion 70 subjects the document sheet image data obtained from the scan control portion 30, to image processing such as an image rotation process, a halftone process, or a size-cut process. In addition, the image processing portion 70 also executes a process of converting document sheet image data obtained from the scan control portion 30 and job data obtained from the wireless communication portion 60, into the recording image data, and transmitting the recording image data to the print control portion 50.

The scan control portion 30, the print control portion 50, and the image processing portion 70 are each composed of, for example, a DSP (Digital Signal Processor) or an ASIC (Application Specific Integrated Circuit).

The finisher 80 is configured to execute various processes on sheet members 901 after images are formed thereon, in accordance with control commands from the main control portion 90. As one example, the finisher 80 has various functions to perform a binding work, a punching work, a sheet shift and the like.

In the binding work, a plurality of sheet members 901 with images formed thereon are bound by driving staple(s) thereinto or by crimping. The punching work is a work of making hole(s) in sheet member(s) 901. The sheet shift is a function to discharge, to a discharge sheet tray, sheet members 901 with images formed thereon that are continuously fed from the main body of the image forming apparatus 10, by shifting the sheet members 901 for every predetermined number thereof.

The operation/display portion 100 includes an operation portion and a display portion, wherein the operation portion includes, for example, a touch panel and operation buttons, and the display portion includes, for example, a liquid crystal display panel and a notification lamp.

The main control portion 90 comprehensively controls the other control portions. As one example, the main control portion 90 displays an operation menu on the operation/display portion 100. Furthermore, the main control portion 90 outputs control commands to the other control portions based on detection results of various sensors and input information that is input via operations on the operation/display portion 100. As shown in FIG. 1, the main control portion 90 includes an MPU (Micro Processor Unit) 91 and a storage portion 92.

The MPU 91 is a processor for executing various calculations and data processing. The storage portion 92 is a nonvolatile storage portion for storing various types of information that are referenced by the MPU 91. In addition, the MPU 91 can read and write various types of information from/to the storage portion 92.

The storage portion 92 stores programs for causing the MPU 91 to execute various processes, stores information referenced by the MPU 91 executing the programs, and stores information written by the MPU 91. The main control portion 90 also includes a volatile storage portion (not illustrated) such as a RAM for temporarily storing programs for execution by the MPU 91.

[Head Mount Device 1]

Figure 2:
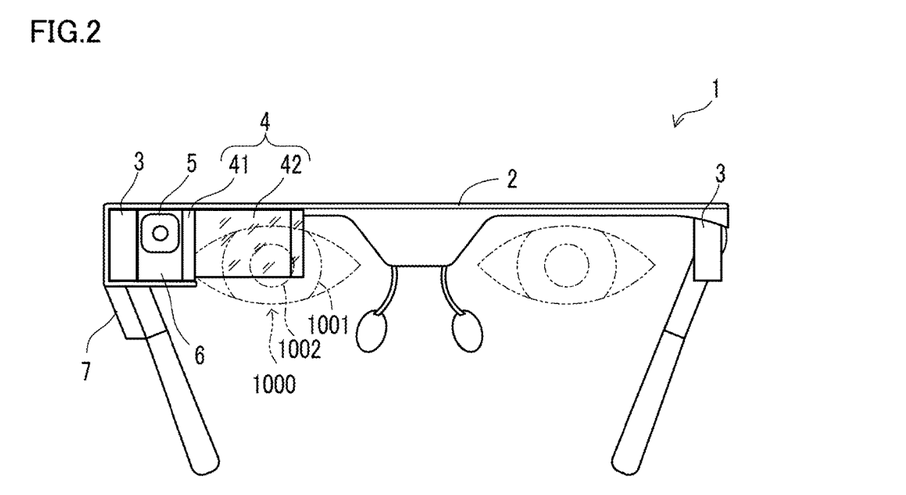
FIG. 2 is a configuration diagram of a head mount device according to a first embodiment.
Figure 3:
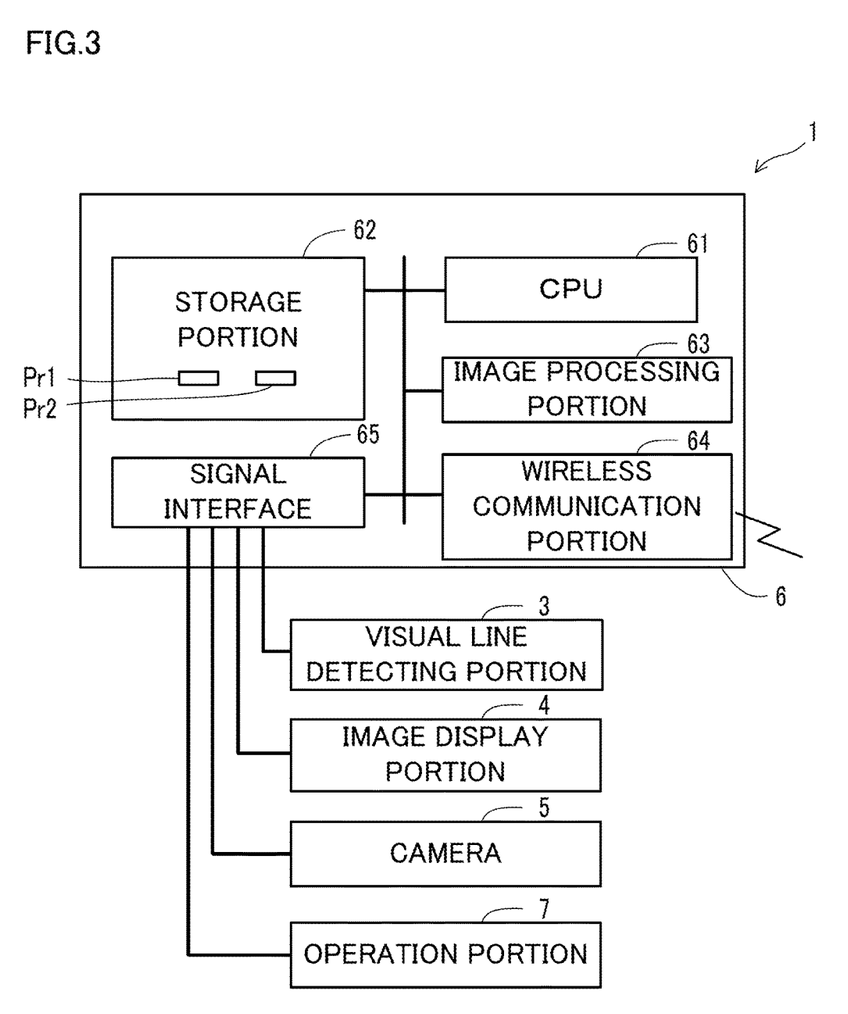
FIG. 3 is a block diagram of a data-processing-related portion of the head mount device according to the first embodiment.

Next, with reference to FIG. 2 and FIG. 3, the configuration of the head mount device 1 according to the first embodiment is described. The head mount device 1 is an example of the information processing apparatus configured to be worn by a user of the image forming apparatus 10.

The head mount device 1 includes a support body 2, a visual line detecting portion 3, an image display portion 4, a camera 5, a main calculation portion 6, and an operation portion 7. The image display portion 4 includes an image projection portion 41 and a prism 42. It is noted that the head mount device 1 also includes a battery for supplying power to electronic equipment included in the head mount device 1, and includes other equipment (not illustrated).

The support body 2 is a member that support the other components of the head mount device 1. The support body 2 is like an eyeglass frame worn on a face of the user. The support body 2 is supported by the nose and ears of the user.

The camera 5 is fixed to the support body 2 at a position where the camera 5 does not intercept the visual field of the user wearing the head mount device 1. The camera 5 is fixed to the support body 2 in the state of facing the same direction as the visual field of the user. The camera 5 is a visual field camera for photographing the visual field of the user. Hereinafter, an image photographed by the camera 5 is referred to as a visual field image.

The visual line detecting portion 3 is a sensor for detecting a direction of the visual line of the user. The visual line direction detected by the visual line detecting portion 3 is a relative direction based on the orientation of the head mount device 1, not an absolute direction based on the earth. In the example shown in FIG. 2, a pair of visual line detecting portions 3 are fixed to the support body 2 at positions outside two eyeballs 1001 of the user.

The retina and the cornea of each eyeball 1001 are electrically charged to different polarities. The orientation of an electric field that extends from the retina toward the cornea is determined in accordance with the visual line direction of the user. The visual line detecting portion 3 detects the visual line direction of the user by detecting the orientation of an electric field generated in the eyeball 1001.

It is noted that each of the visual line detecting portions 3 may include a visual line detection camera and an image processing portion. In that case, the visual line detection camera continuously photographs the eyeball 1001 of the user. The image processing portion detects the visual line detection of the user by detecting the position of a pupil 1002 from the image of the eyeball 1001.

The image display portion 4 is supported in front of an eye 1000 of the user, and is configured to allow the user to visually recognize an image. The image display portion 4 of the present embodiment allows the user to visually recognize an image by retina projection.

In the image display portion 4, the image projection portion 41 is fixed to the support body 2 at a position outside the visual field of the user. The prism 42 is transparent and is fixed to the support body 2 at a position within the visual field of the user.

The image projection portion 41 projects the light of the image onto the prism 42. The prism 42 reflects the projected light of the image such that the reflected light of the image is projected onto the retina of the eye 1000 of the user. In this case, the user, when seeing forward through the prism 42, visually recognizes an image in which a real image in the visual field overlaps with the image projected by the image projection portion 41. That is, the display area of the image display portion 4 for displaying an image overlaps with the visual field of the user.

In the head mount device 1, a predetermined calibration is performed in advance. This makes it possible for the image display portion 4 to obtain coordinate correspondence information that indicates correspondence between a visual line direction of the user detected by the visual line detecting portion 3 and a position in the display area of the image display portion 4.

The image display portion 4 can display an arbitrary projection image on a position in the display area of the image display portion 4, the position corresponding to the visual line direction of the user.

As one example, the image display portion 4 displays, in the display area, a cursor image that moves toward a position corresponding to the visual line direction of the user continuously detected by the visual line detecting portion 3.

In addition, while the image display portion 4 displays an image on a position in the visual field of the user, the image display portion 4 can determine, based on the coordinate correspondence information, whether or not the visual line of the user is oriented toward the displayed image.

The operation portion 7 inputs information in accordance with an operation performed by a hand of the user. As one example, the operation portion 7 may include one or both of the touch pad and the operation button(s).

The main calculation portion 6 obtains information input via the operation portion 7, and data of a visual field image captured by the camera 5, and performs various calculations. Furthermore, the main calculation portion 6 controls the camera 5 and the image display portion 4.

As shown in FIG. 3, the main calculation portion 6 includes a CPU (Central Processing Unit) 61, a storage portion 62, an image processing portion 63, a wireless communication portion 64, and a signal interface 65.

The CPU 61 is a processor for executing various calculations and data processing. The storage portion 62 is a nonvolatile storage portion for storing various types of information that are referenced by the CPU 61. In addition, the CPU 61 can read and write various types of information from/to the storage portion 62.

The storage portion 62 stores programs for causing the CPU 61 to execute various processes, stores information referenced by the CPU 61 executing the programs, and stores information written by the CPU 61. The main calculation portion 6 also includes a volatile storage portion (not illustrated) such as a RAM for temporarily storing programs for execution by the CPU 61.

The image processing portion 63 is a calculation portion for subjecting data of the visual field image captured by the camera 5 to various types of image processing. The image processing portion 63 is composed of, for example, a DSP or an ASIC.

The wireless communication portion 64 performs, through wireless signals, data transmissions/receptions with another image forming apparatus 10 and other equipment. Furthermore, the wireless communication portion 64 sends and receives transmission data and reception data to/from the CPU 61. As one example, the wireless communication portion 64 performs a wireless communication such as a Wi-Fi communication or a Bluetooth communication.

The signal interface 65 relays the data transfer between the CPU 61 and any of the visual line detecting portion 3, the image display portion 4, the camera 5, and the operation portion 7. Furthermore, the signal interface 65 relays the transfer of the data of the visual field image from the camera 5 to the image processing portion 63.

Meanwhile, in the image forming apparatus 10 which may be a copier or a facsimile apparatus, the operability will be improved if the user can specify setting conditions for image-formation-related processes more easily.

For example, the image forming apparatus 10 includes the finisher 80 that is configured to execute the binding work or the punching work on sheet members 901 on which images have been formed by a copy process. In that case, in the image forming apparatus 10, it is troublesome to select a desired work position from among multiple candidates for the work position. With regard to a positional condition in the image-formation-related processes, if it is possible to specify a condition in such a way as to point at a position on a target such as a document sheet 900, it is possible to specify the positional condition intuitively, thereby improving the operability.

When the head mount device 1 is adopted, the user of the image forming apparatus 10 can intuitively specify a positional condition among the setting conditions for image-formation-related processes.

[Positional Condition Specification Process]

Next, an example of a procedure of a positional condition specification process in the head mount device 1 is described with reference to the flowchart shown in FIG. 4. This procedure is an example of the procedure of the setting condition specification method for the image forming apparatus 10, wherein the head mount device 1 is used in the method.

The positional condition specification process according to the present embodiment is a process of specifying a work position condition on a sheet member 901 during a work process following the copy process in which an image is formed on the sheet member 901. The work process is a process of performing the binding work or the punching work. This process is an example of the process that is performed when a positional condition among the setting conditions for image-formation-related processes is specified.

It is noted that in the copy process of the image forming apparatus 10, the scan portion 20 reads an image from a document sheet 900, and the read image is formed on a sheet member 901 by the print portion 40. The positional condition specification process shown in FIG. 4 is started when a predetermined start event for the positional condition specification occurs.

An example of the start event is to receive, from the image forming apparatus 10, a notification that a predetermined condition setting start operation has been performed on the operation/display portion 100 of the image forming apparatus 10 after a connection for a wireless communication between the head mount device 1 and the image forming apparatus 10 was established.

Another example of the start event is a predetermined condition setting start operation performed on the operation portion 7 of the head mount device 1.

Figure 4:
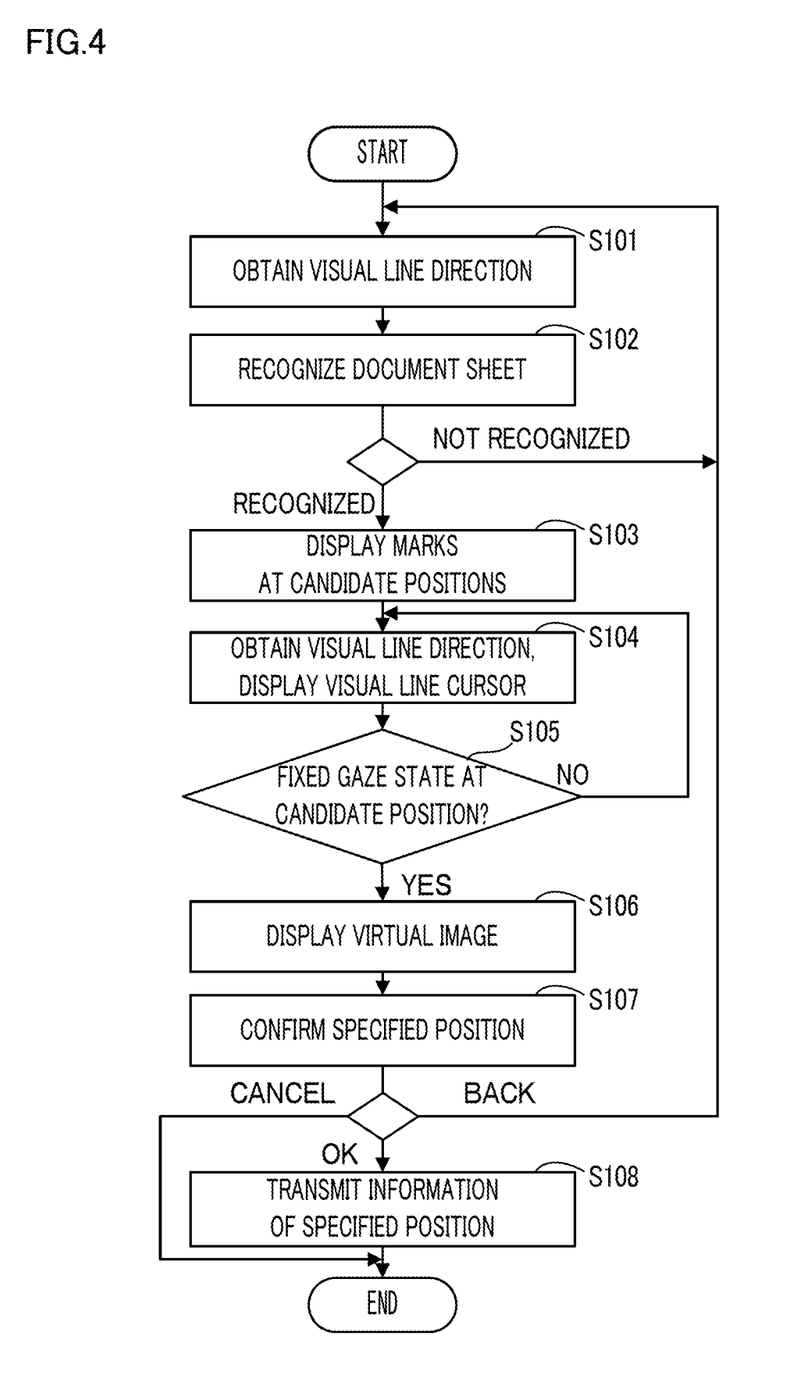
FIG. 4 is a flowchart showing an example of the procedure of a positional condition specification process in the head mount device according to the first embodiment.

When the start event occurs, the main calculation portion 6 outputs a notification that requests the user to watch a document sheet 900 that is the target of the copy process, and then starts the process shown in FIG. 4. The notification is, for example, a message displayed on the image display portion 4. In accordance with the notification, the user wearing the head mount device 1 watches the document sheet 900. The camera 5 outputs data of the visual field image including the image of the document sheet 900 to the main calculation portion 6.

In the following description, S101, S102, . . . are identification signs representing the steps executed by the main calculation portion 6. When the CPU 61 executes a first positional condition specification program Pr1 stored in the storage portion 62, the main calculation portion 6 executes the positional condition specification process.

<Step S101>

In the positional condition specification process, the CPU 61 of the main calculation portion 6 obtains a detection result of the visual line direction of the user from the visual line detecting portion 3.

<Step S102>

Subsequently, the image processing portion 63 of the main calculation portion 6 executes a document sheet recognition process. In the document sheet recognition process, the image of the document sheet 900 included in the visual field image photographed by the camera 5 is recognized.

In the present embodiment, the document sheet 900 is an example of the specification target, namely a target of specification of the work position condition, wherein the work position condition is an example of the positional condition among the setting conditions for image-formation-related processes. In addition, the image processing portion 63 that executes the process of step S102 is an example of the target image recognizing portion configured to recognize an image of the specification target included in the visual field image photographed by the camera 5.

As one example, the image processing portion 63 detects a rectangular image that is present in a predetermined range whose center is the visual line direction in the visual field image, and recognizes the rectangular image as an image of the document sheet 900.

The image processing portion 63 repeats the processes of steps S101 and S102 until the image of the document sheet 900 is recognized. It is noted that, although it is not shown in FIG. 4, when a predetermined condition for interruption is satisfied, the image processing portion 63 interrupts the document sheet recognition process. This causes the positional condition specification process to end.

The condition for interruption is, for example, a case where the image of the document sheet 900 could not be recognized within a predetermined time, or a case where a predetermined interruption operation was performed via the operation portion 7.

<Step S103>

Figure 5:
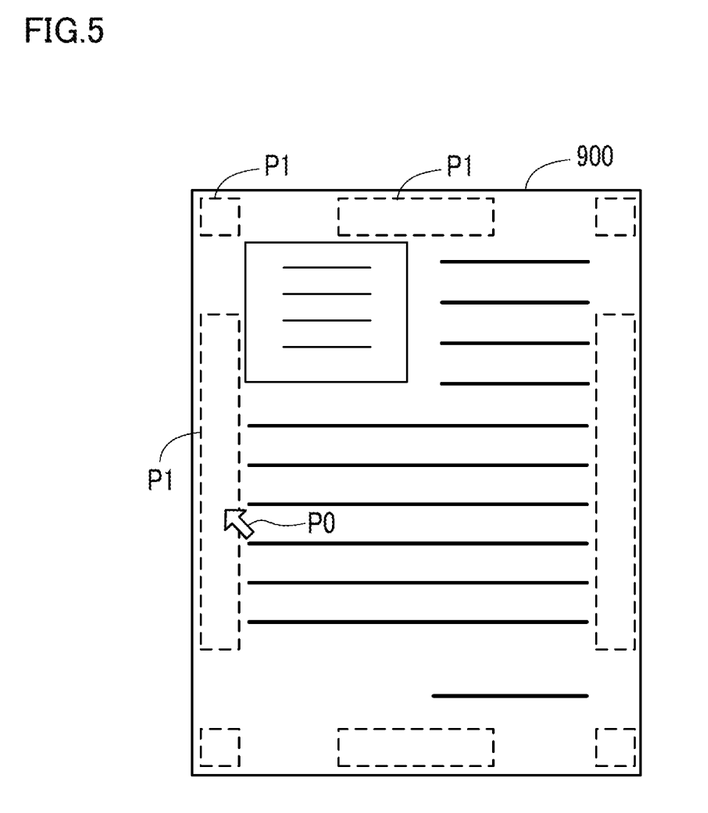
FIG. 5 is a diagram showing an example of an image of the user's visual field including position specification candidate marks projected on the head mount device according to the first embodiment.

Upon recognition of the image of the document sheet 900, the CPU 61 of the main calculation portion 6 displays specification candidate marks P1 in a display area of the image display portion 4. FIG. 5 is a diagram showing an example of the image of the user's visual field including the specification candidate marks P1 projected on the image display portion 4.

The specification candidate marks P1 are images indicating positions that are candidates for specification of a work position. The specification candidate marks P1 are displayed at positions in the display area of the image display portion 4, the positions being candidates for specification of a work position.

The specification candidate marks P1 shown in FIG. 5 are frame images drawn by a dotted line indicating the candidates for a binding work position. In this example, the candidates for a binding work position are four end portions located respectively at centers of the four sides of the rectangular document sheet 900, and four corner portions of the document sheet 900.

In FIG. 5, the document sheet 900 is a real document sheet visually recognized by the user, and the specification candidate marks P1 are images projected in the visual field of the user by the image display portion 4. This allows the user to recognize that the specification candidate marks P1 are displayed on the document sheet 900 watched by the user.

When the work to be performed on a sheet member 901 is the punching work, the candidates for a punching work position may be four end portions located respectively at centers of the four sides of the rectangular document sheet 900.

After the specification candidate marks P1 are displayed, the image processing portion 63 obtains data of the visual field image from the camera 5 as necessary, and executes the document sheet recognition process on the obtained data. When the recognized image of the document sheet 900 changes in position, the CPU 61 updates the display positions of the specification candidate marks P1 based on the position of the image of the document sheet 900, by controlling the image display portion 4.

<Step S104>

After the image of the document sheet 900 is recognized, the CPU 61 of the main calculation portion 6 obtains the latest visual line direction from the visual line detecting portion 3 as necessary, and displays a cursor P0 at a position corresponding to the latest visual line direction in the display area of the image display portion 4 (see FIG. 5). The cursor P0 is an image indicating the visual line direction of the user.

<Step S105>

Furthermore, the CPU 61 of the main calculation portion 6 determines whether or not the visual line direction has entered a fixed gaze state where it is fixed to any of the candidate positions for specification of the work position. The fixed gaze state is a state where the visual line direction is maintained in a predetermined narrow range for a predetermined fixed gaze time that has been set.

In the present embodiment, candidate positions for specification of the work position are display positions of the specification candidate marks P1. In addition, in the present embodiment, when the visual line direction has entered the fixed gaze state, it means that the user specified a position of the visual line direction by the user's intention.

The CPU 61 repeats the processes of steps S104 and S105 until the visual line direction enters the fixed gaze state where it is fixed to any of the candidate positions for specification of the work position.

The processes of steps S104 and S105 are a process of determining a specified work position based on a position in the recognized image of the document sheet 900 that corresponds to the detected visual line direction. In the present embodiment, the specified work position is any of a plurality of display positions of the specification candidate marks P1. It is noted that the CPU 61 that executes the processes of steps S104 and S105 is an example of the positional condition determining portion.

<Step S106>

Figure 6:
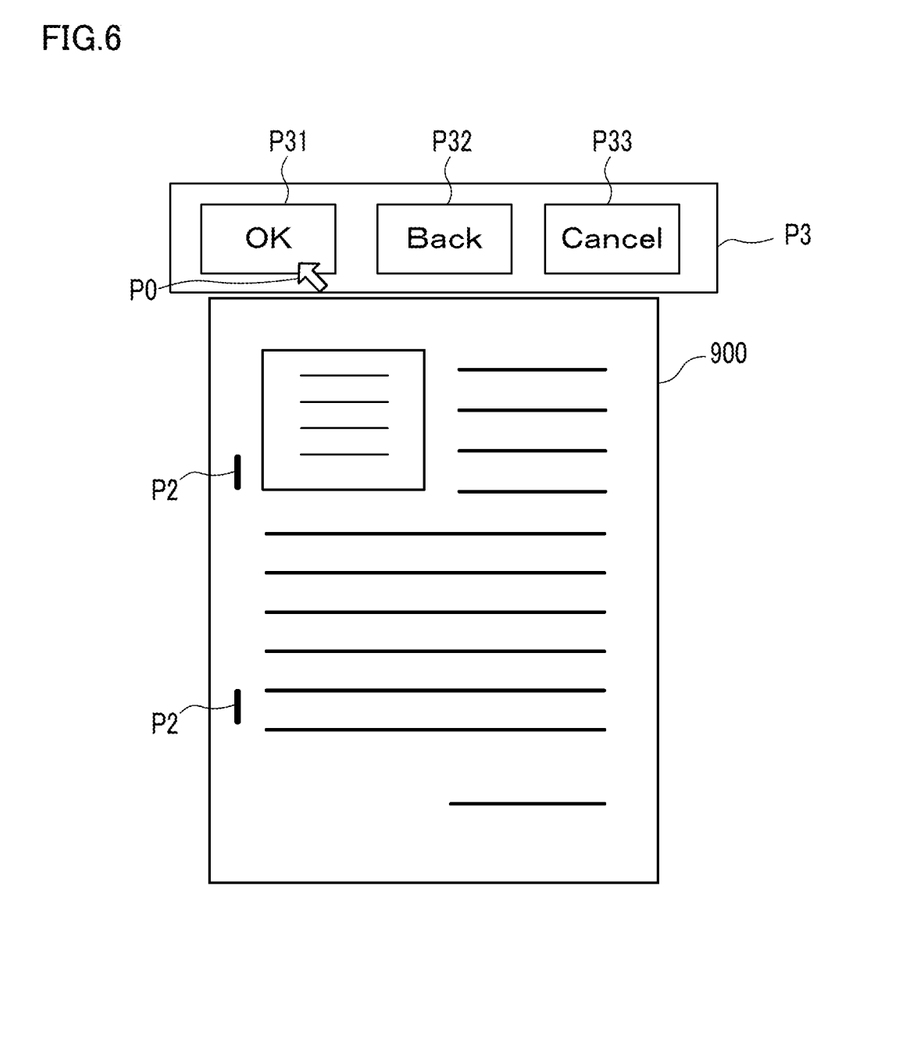
FIG. 6 is a diagram showing an example of an image of the user's visual field including virtual staple images and a confirmation menu projected on the head mount device according to the first embodiment.
Figure 7:
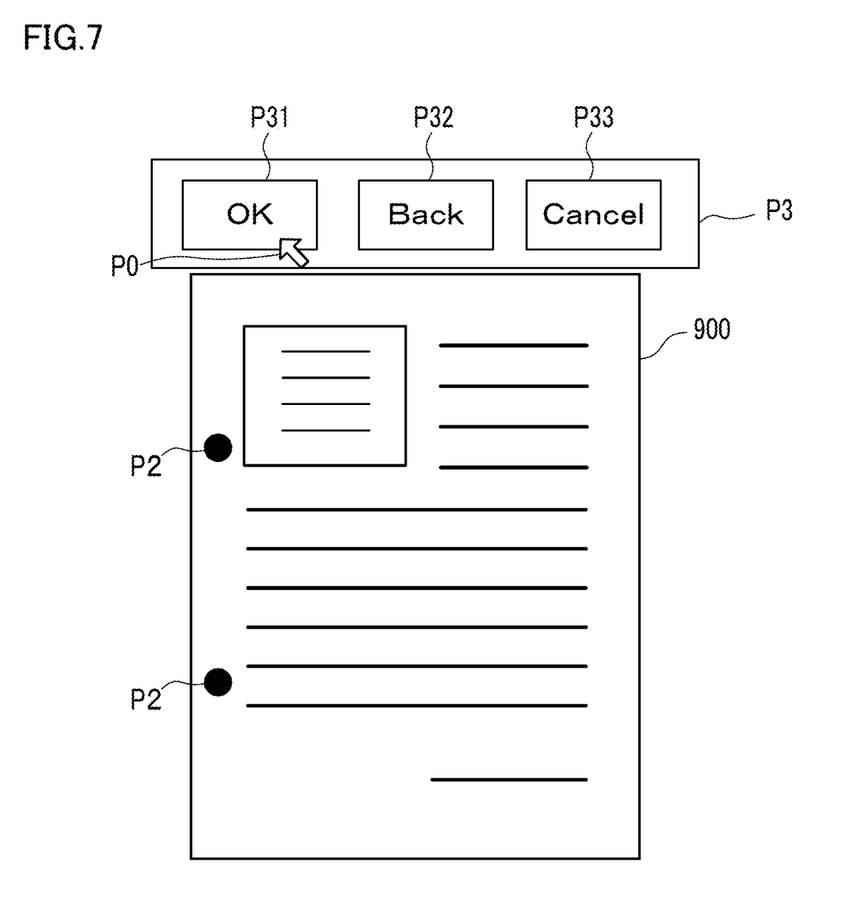
FIG. 7 is a diagram showing an example of an image of the user's visual field including virtual punched hole images and a confirmation menu projected on the head mount device according to the first embodiment.

When the visual line direction has entered the fixed gaze state where it is fixed to any of the candidate positions for specification of the work position, the CPU 61 controls the image display portion 4 so as to display a virtual image P2 (see FIG. 6, FIG. 7). The virtual image P2 shows a look of a portion of the document sheet 900 after the work is applied thereto.

The CPU 61 displays the virtual image P2 at a position in the display area of the image display portion 4 that corresponds to the specified work position. The specified work position is one of the positions of the specification candidate marks P1 that is displayed in the visual line direction that was determined in step S105 as having entered the fixed gaze state. It is noted that the work position is an example of the positional condition.

As shown in FIG. 6, when the work is the binding work on a sheet member 901, the virtual image P2 is an image of a bound portion such as an image of staples. In addition, as shown in FIG. 7, when the work is the punching work on a sheet member 901, the virtual image P2 is an image of punched holes.

It is noted that the virtual image P2 is an example of the predetermined confirmation image. The CPU 61 that executes the process of step S106 is an example of the display control portion configured to display the confirmation image at a position in the display area of the image display portion 4 that corresponds to the specified positional condition.

In addition, in place of displaying the virtual image P2, the following process may be executed. For example, a specification candidate mark P1 at the specified position may be displayed in highlight compared to the specification candidate marks P1 at the other positions. Alternatively, only a specification candidate mark P1 at the specified position may be displayed, and the specification candidate marks P1 at the other positions may be deleted. In these cases, the specification candidate mark P1 that is displayed in highlight or the specification candidate mark P1 that is remained to be displayed is an example of the confirmation image.

<Step S107>

Furthermore, the CPU 61 of the main calculation portion 6 executes a specified position confirmation process. For example, in the specified position confirmation process, the CPU 61 displays a confirmation menu P3 in the display area by controlling the image display portion 4.

In the examples shown in FIG. 6 and FIG. 7, the confirmation menu P3 includes, as selection candidates, a decision selecting portion P31, a return selecting portion P32, and a cancellation selecting portion P33. The decision selecting portion P31 is a selection candidate that designates decision to accept the specified work position. The return selecting portion P32 is a selection candidate that designates discarding information of the specified work position and returning to step S101 to repeat the process. The cancellation selecting portion P33 is a selection candidate that designates cancellation of the positional condition specification process.

When the visual line direction detected by the visual line detecting portion 3 enters the fixed gaze state pointing at any of the decision selecting portion P31, the return selecting portion P32, and the cancellation selecting portion P33, the CPU 61 determines that a selection candidate located in the visual line direction has been selected.

When the return selecting portion P32 is selected from the confirmation menu P3, the CPU 61 discards information of the specified work position and executes the processes from step S101 again. When the cancellation selecting portion P33 is selected from the confirmation menu P3, the CPU 61 ends the positional condition specification process.

<Step S108>

When the decision selecting portion P31 is selected from the confirmation menu P3, the CPU 61 of the main calculation portion 6 executes the process of step S108. In step S108, the CPU 61 wirelessly transmits information of a work position specified in step S105, namely, the information of the specified work position, to the image forming apparatus 10 via the wireless communication portion 64. This completes the positional condition specification process in the head mount device 1.

Upon receiving the information of the specified work position via the wireless communication portion 60, the main control portion 90 of the image forming apparatus 10 sets a work position for a work to be performed on a sheet member 901, according to the information of the specified work position.

It is noted that in the image forming apparatus 10, the MPU 91 executes a positional condition setting program Pr10 stored in the storage portion 92, thereby the main control portion 90 executes a process related to the setting of the positional condition.

The process related to the setting of the positional condition includes a process of receiving the information of the specified work position from the head mount device 1, and a process of setting, in accordance with the information of specified work position, the work position for the work to be performed on the sheet member 901. Furthermore, the process related to the setting of the positional condition may include a process of wirelessly transmitting the notification that the condition setting start operation has been performed on the operation/display portion 100, to the head mount device 1.

According to the present embodiment, it is possible to specify a work position condition by indicating, by a visual line, a position on a document sheet 900 that is a real document sheet. This makes it possible for the user of the image forming apparatus 10 to intuitively and easily specify the positional condition among the setting conditions for image-formation-related processes. As a result, the operability of the image forming apparatus 10 is improved.

In addition, in the present embodiment, the virtual image P2 is displayed on a specified position in the area of the document sheet 900 in the user's visual field. This allows the user to simulatively confirm the finished state of the work on the sheet member 901 in advance. As a result, it is possible to specify the work position condition more intuitively without error.

Second Embodiment

Next, a head mount device according to a second embodiment is described with reference to FIG. 8 to FIG. 10. The head mount device 1 of the present embodiment has the same configuration as the above-described head mount device 1. The head mount device 1 of the present embodiment also executes the positional condition specification process.

The positional condition specification process of the present embodiment is a process of specifying, as the positional condition, a positional condition of the supplier of a sheet member 901 in the print process in which an image is formed on the sheet member 901.

Figure 9:
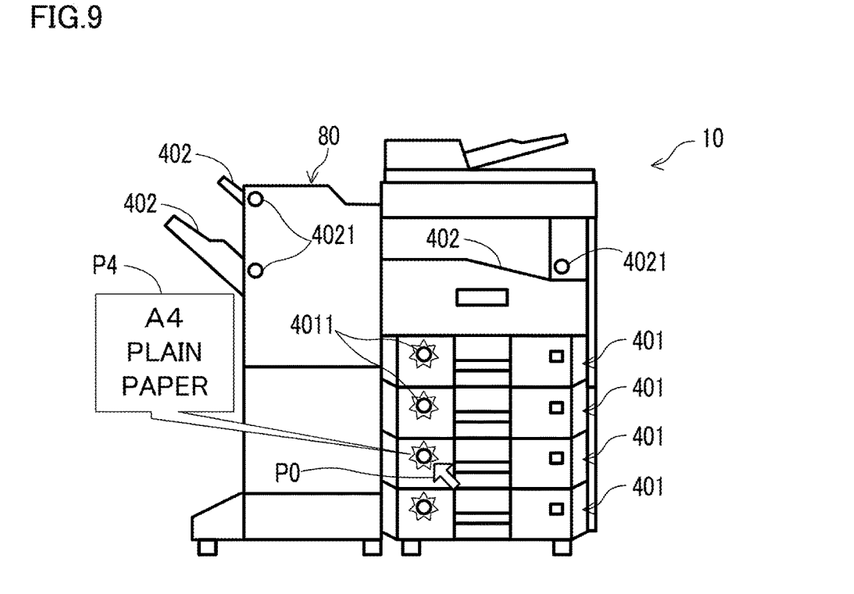
FIG. 9 is a diagram showing an example of the user's visual field image including explanation information projected on the head mount device of the second embodiment.

As shown in FIG. 9, the image forming apparatus 10 includes a plurality of sheet feed portions 401 that are suppliers of sheet members 901. That is, specifying the position of the supplier of a sheet member 901 is to specify any of the plurality of sheet feed portions 401. The sheet feed portions 401 are, for example, sheet feed cassettes that can be drawn out from the main body of the image forming apparatus 10.

It is noted that the sheet feed portions 401 of the image forming apparatus 10 are an example of the sheet support portions that are candidates for a supplier of a sheet member 901 in the print process. In addition, as described below, the position of a discharge destination of a sheet member 901 in the print process may be specified as the positional condition. In this case, sheet discharge portions 402 are a target of the specification of the position (see FIG. 9).

The sheet discharge portions 402 are an example of the sheet support portions that are candidates for a discharge destination of a sheet member 901 in the print process. The image forming apparatus 10 includes a plurality of sheet discharge portions 402. The sheet discharge portions 402 are, for example, sheet discharge trays in the main body portion of the image forming apparatus 10, or sheet discharge bins included in the finisher 80.

The copy process is an example of the print process. In addition, the print process includes a process of forming an image on a sheet member 901 based on image data that is stored in the storage portion 92 of the image forming apparatus 10 in advance.

Figure 8:
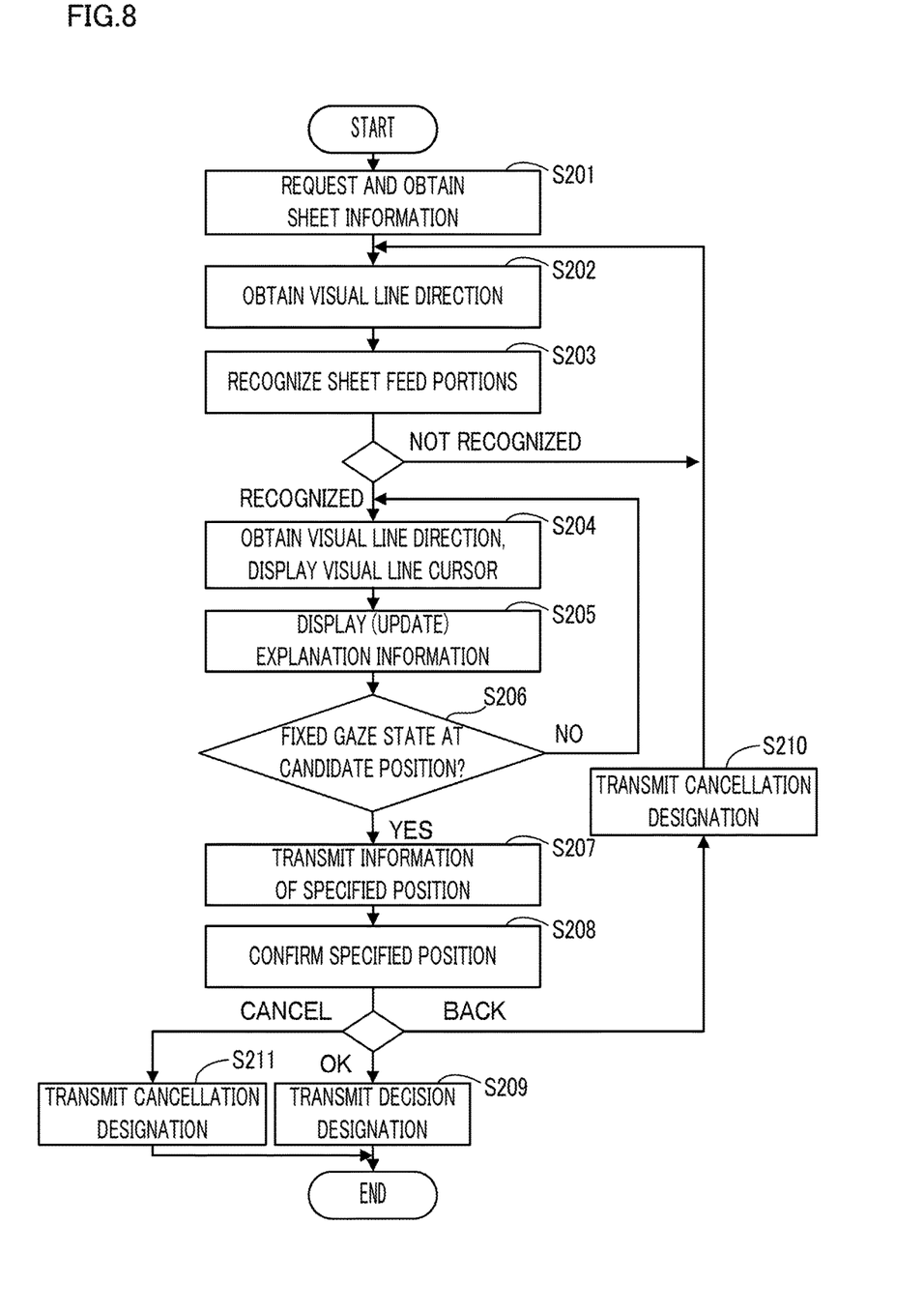
FIG. 8 is a flowchart showing an example of the procedure of a positional condition specification process in a head mount device according to a second embodiment.

FIG. 8 is a flowchart showing an example of the procedure of the positional condition specification process in the head mount device according to the present embodiment. This procedure is an example of the procedure of the setting condition specification method for the image forming apparatus 10 using the head mount device 1.

FIG. 9 is a diagram showing an example of the user's visual field image including explanation information P4 projected on the head mount device of the present embodiment. FIG. 10 is a diagram showing an example of the user's visual field image including the confirmation menu P3 projected on the head mount device of the present embodiment.

When the start event occurs, the main calculation portion 6 outputs a notification that requests the user to watch the image forming apparatus 10, and then starts the process shown in FIG. 8. The notification is, for example, a message displayed on the image display portion 4. In accordance with the notification, the user wearing the head mount device 1 watches the image forming apparatus 10. As a result, the camera 5 outputs data of the visual field image including the image of the document sheet 900 to the main calculation portion 6.

In the following description, S201, S202, . . . are identification signs representing the steps executed by the main calculation portion 6. When the CPU 61 executes a second positional condition specification program Pr2 stored in the storage portion 62, the main calculation portion 6 executes the positional condition specification process.

<Step S201>

When the positional condition is a positional condition of the sheet feed portions 401, the CPU 61 of the main calculation portion 6 sends a request for sheet information to the image forming apparatus 10 via the wireless communication portion 64, and obtains the sheet information. The sheet information indicates a plurality of types of sheet members 901 that are respectively set in the sheet feed portions 401. As one example, the sheet information may include information of the size and material of the sheet member 901.

The sheet information is an example of the explanation information explaining the suppliers of the sheet members 901 in the image forming apparatus 10.

<Step S202>

Furthermore, the CPU 61 of the main calculation portion 6 obtains a detection result of the user's visual line direction from the visual line detecting portion 3.

<Step S203>

Subsequently, the image processing portion 63 of the main calculation portion 6 executes a sheet feed portion recognition process. In the sheet feed portion recognition process, images of the sheet feed portions 401 included in the visual field image photographed by the camera 5 are recognized.

In the present embodiment, the sheet feed portions 401 are an example of the specification target that is a target of specification of a supplier condition, wherein the supplier supplies sheet members 901, and the supplier condition is an example of the positional condition among the setting conditions for image-formation-related processes. In addition, the image processing portion 63 that executes the process of step S203 is an example of the target image recognizing portion configured to recognize an image of the specification target included in the visual field image photographed by the camera 5.

As one example, the image processing portion 63 detects an image of a lamp 4011 that is lit in a predetermined range whose center is the visual line direction in the visual field image, and recognizes the image of the lamp 4011 as an image of the sheet feed portion 401. The image processing of recognizing the image of the lamp 4011 is easier and surer than the image processing of recognizing the image of the sheet feed portion 401 itself.

Figure 10:
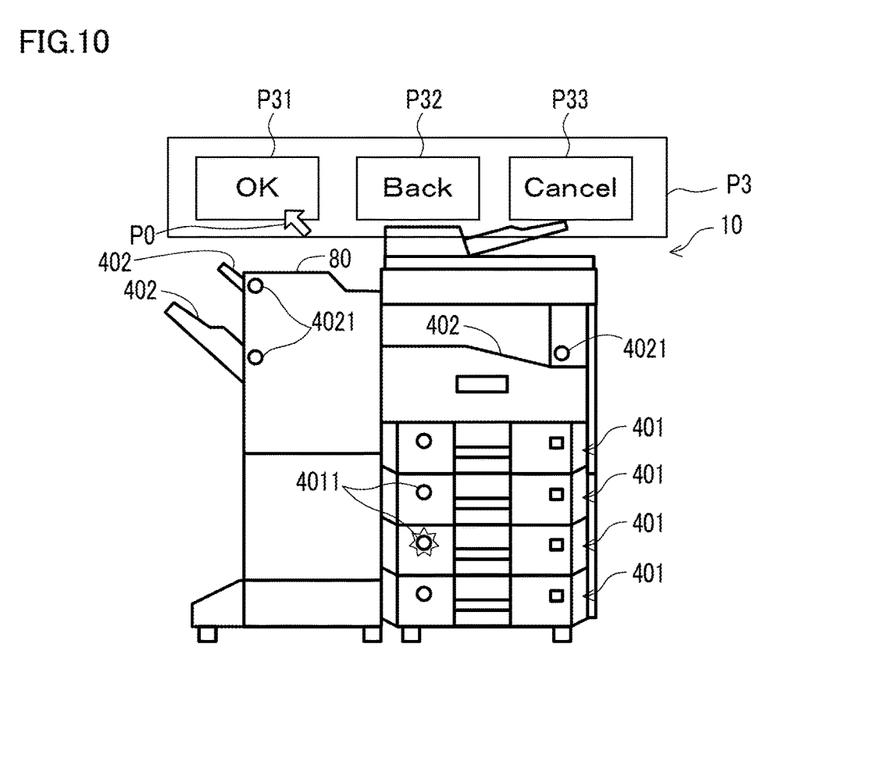
FIG. 10 is a diagram showing an example of the user's visual field image including a confirmation menu projected on the head mount device of the second embodiment.

As shown in FIG. 9 and FIG. 10, the image forming apparatus 10 includes a plurality of lamps 4011 that respectively correspond to the plurality of sheet feed portions 401. As shown in FIG. 9, when the start envent occurs, the image forming apparatus 10 lights all the lamps 4011 of the sheet feed portions 401.

The image processing portion 63 detects, from the visual field image, a plurality of dot-like images that are brighter than a predetermined level, and recognizes the dot-like images as the images of the plurality of lamps 4011, namely, the images of the plurality of sheet feed portions 401. In addition, the luminescent color of the lamps 4011 may be set in advance, and the image processing portion 63 may distinguish the images of the lamps 4011 from the other images by distinguishing the luminescent color.

The image processing portion 63 repeats the processes of steps S202 and S203 until the images of the sheet feed portions 401 are recognized. It is noted that, as is the case with steps S101 and S102 shown in FIG. 4, although it is not shown in FIG. 8, when a predetermined condition for interruption is satisfied, the image processing portion 63 interrupts the sheet feed portion recognition process. This causes the positional condition specification process to end.

After the images of the sheet feed portions 401 are recognized, the image processing portion 63 obtains data of the visual field image from the camera 5 as necessary, and executes the sheet feed portion recognition process on the obtained data. The CPU 61 updates the information stored therein regarding the positions of the images of the sheet feed portions 401, namely, information regarding the positions of the images of the lamps 4011, to the latest information.

<Step S204>

After the images of the sheet feed portions 401 in the visual field image are recognized, the CPU 61 of the main calculation portion 6 obtains the latest visual line direction of the user from the visual line detecting portion 3 as necessary, and displays the cursor P0 at a position corresponding to the latest visual line direction in the display area of the image display portion 4 (see FIG. 9).

<Step S205>

When the visual line direction of the user is in the state of being oriented toward any of the positions of the recognized images of the plurality of sheet feed portions 401, the CPU 61 of the main calculation portion 6 displays, in the display area of the image display portion 4, explanation information P4 of a sheet feed portion 401 that is located in the visual line direction. The explanation information P4 of the present embodiment is the sheet information obtained from the image forming apparatus 10 in step S201.

It is noted that when the visual line direction of the user is in the state of not being oriented toward any of the positions of the recognized images of the plurality of sheet feed portions 401, the explanation information P4 is not displayed.

In FIG. 9, the image forming apparatus 10 is a real image forming apparatus 10 visually recognized by the user, and the cursor P0 and the image of the explanation information P4 are images projected in the visual field of the user by the image display portion 4.

<Step S206>

Furthermore, after the images of the sheet feed portions 401 in the visual field image are recognized, the CPU 61 of the main calculation portion 6 determines whether or not the visual line direction has entered the fixed gaze state where it is fixed to any of the candidate positions for specification of a sheet feed portion 401. Step S206 is the same as step S105 of FIG. 4.

The CPU 61 repeats the processes of steps S204 and S206 until the visual line direction enters the fixed gaze state of being fixed to any of the candidate positions for specification of the sheet feed portion 401.

The processes of steps S204 and S206 are a process of determining a supplier of the sheet member 901 by selecting an image located in the visual line direction from among the images of the plurality of sheet feed portions 401. In the present embodiment, the supplier of the sheet member 901 is any one among the plurality of sheet feed portions 401. It is noted that the CPU 61 that executes the processes of steps S204 to S206 is an example of the positional condition determining portion.

<Step S207>

When the visual line direction has entered the fixed gaze state where it is fixed to any of the candidate positions for specification of the sheet feed portion 401, the CPU 61 executes the process of step S207. In step S207, the CPU 61 wirelessly transmits information of a sheet feed portion 401 specified in step S206, namely, specification information of the supplier of the sheet member 901, to the image forming apparatus 10 via the wireless communication portion 64.

The information transmitted from the head mount device 1 to the image forming apparatus 10 in step S207 is temporary information specifying the supplier of the sheet member 901. The specification of the supplier of the sheet member 901 is decided during a specified position confirmation process that is described below.

Upon receiving specification information of the sheet feed portion 401, namely, specification information of the supplier of the sheet member 901, the main control portion 90 of the image forming apparatus 10 temporarily stored the received information until it receives a decision instruction from the head mount device 1.

Furthermore, upon receiving the specification information of the sheet feed portion 401, the main control portion 90 lights a lamp 4011 that corresponds to the specification information in such a manner that the lit lamp 4011 is distinguishable from the other lamps 4011 (see FIG. 10). This allows the user to confirm, by the visual line of the user himself/herself, whether or not a sheet feed portion 401 has been specified by the user's intention.

As one example, the main control portion 90 lights only a lamp 4011 that corresponds to the specification information of the sheet feed portion 401. Alternatively, the main control portion 90 may blink only a lamp 4011 that corresponds to the specification information of the sheet feed portion 401, and light the other lamps 4011 with constant brightness.

<Step S208>

Furthermore, as is the case with step S107 of FIG. 4, the CPU 61 of the main calculation portion 6 executes a specified position confirmation process. For example, in the specified position confirmation process, the CPU 61 controls the image display portion 4 so as to display a confirmation menu P3 in the display area (see FIG. 10).

<Step S209>

When the decision selecting portion P31 is selected from the confirmation menu P3, the CPU 61 of the main calculation portion 6 executes the process of step S209. In step S209, the CPU 61 wirelessly transmits decision designation information to the image forming apparatus 10 via the wireless communication portion 64, wherein the decision designation information instructs to decide the specification information of the sheet feed portion 401 that was transmitted to the image forming apparatus 10 in step S207. With this operation, the positional condition specification process of the head mount device 1 ends.

Upon receiving the decision designation information via the wireless communication portion 60, the main control portion 90 of the image forming apparatus 10 sets the supplier of the sheet member 901 for the print process that is to be executed from now on, in accordance with the specification information of the sheet feed portion 401 that had been received from the head mount device 1.

<Step S210>

When the return selecting portion P32 is selected from the confirmation menu P3, the CPU 61 of the main calculation portion 6 wirelessly transmits cancellation designation information to the image forming apparatus 10 via the wireless communication portion 64, wherein the cancellation designation information instructs to cancel the specification information of the sheet feed portion 401 that was transmitted to the image forming apparatus 10 in step S207. Subsequently, the CPU 61 discards the specification result of the sheet feed portion 401 and executes the processes from step S202 again.

Upon receiving the cancellation designation information via the wireless communication portion 60, the main control portion 90 of the image forming apparatus 10 discards the specification information of the sheet feed portion 401 that had been received from the head mount device 1.

<Step S211>

When the cancellation selecting portion P33 is selected from the confirmation menu P3, the CPU 61 of the main calculation portion 6 also wirelessly transmits the cancellation designation information to the image forming apparatus 10 via the wireless communication portion 64. Subsequently, the CPU 61 ends the positional condition specification process.

In the examples shown in FIG. 8 to FIG. 10, the positional condition of the supplier of the sheet member 901 is specified as the positional condition. On the other hand, there may be a case where the position of the discharge destination of the sheet member 901 in the print process is specified as the positional condition. That is, a sheet discharge portion 402 may be a target of the position specification.

As shown in FIG. 9 and FIG. 10, the image forming apparatus 10 includes a plurality of lamps 4021 that respectively correspond to the plurality of sheet discharge portions 402. In the case where a sheet discharge portion 402 is a target of the position specification, when the start event occurs, the image forming apparatus 10 lights all the lamps 4021 that respectively correspond to the plurality of sheet discharge portions 402.

Furthermore, in the case where a sheet discharge portion 402 is a target of the position specification, the main calculation portion 6 of the head mount device 1 executes the positional condition specification process by the same procedure as the procedure shown in FIG. 8. This makes it possible for the user to intuitively and easily specify a condition for the discharge destination of the sheet member 901.

Application Examples

In the positional condition specification process of the second embodiment, the sheet feed portion recognition process of step S203 may be a process of recognizing, as images of the sheet feed portions 401, images of identification marks drawn at positions respectively corresponding to the sheet feed portions 401 of the image forming apparatus 10. For example, the identification marks may be marks of predetermined colors or marks having special shapes. This also applies to identification of images of the sheet discharge portions 402.

In addition, the sheet feed portion recognition process of step S203 may be a process of recognizing the forms of the sheet feed portions 401. For example, form information may be stored in the storage portion 92 of the image forming apparatus 10 or the storage portion 62 of the head mount device 1 in advance, wherein the form information indicates shapes, colors or the like of the sheet feed portions 401. In that case, the main calculation portion 6 may obtain the form information, and recognize, as an image of a sheet feed portion 401, an image in the visual field image that has a form indicated by the form information. This also applies to identification of images of the sheet discharge portions 402.

in the positional condition specification process of the second embodiment, the process of step S207 may be a process of displaying the predetermined confirmation image in the display area of the image display portion 4.

The confirmation image for confirming the specified sheet feed portion 401 is displayed at a position in the display area of the image display portion 4 that corresponds to a sheet feed portion 401 that was determined as the supplier of the sheet member 901. For example, the confirmation image may be an image of a lamp having a different color from the luminescent color of the lamps 4011, or an image of a blinking lamp. The image of the lamp is displayed overlapping with the position of a lamp 4011. This also applies to the confirmation image for confirming a specified sheet discharge portion 402.

It is noted that the information processing apparatus and the setting condition specification method for the image forming apparatus of the present disclosure may be configured by freely combining, within the scope of claims, the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus configured to be worn by a user of an image forming apparatus, the information processing apparatus comprising:
a camera configured to photograph a visual field of the user;
a visual line detecting sensor configured to detect a visual line direction of the user;
an integrated circuit configured to, when a positional condition among setting conditions for image-formation-related processes is specified, recognize at least one image of at least one specification target that is included in a visual field image photographed by the camera, the specification target being a target of specification of the positional condition;
a processor configured to, in a case where the visual line direction detected by the visual line detecting sensor is fixed to any of a plurality of predetermined candidate positions in an image of a specification target recognized by the integrated circuit, or in a case where the visual line detection is fixed to any of a plurality of images of a plurality of specification targets recognized by the integrated circuit, determine a specified positional condition based on a position to which the visual line direction is fixed; and a WI-FI or BLUETOOTH wireless communication device configured to wirelessly transmit information of the specified positional condition to the image forming apparatus, wherein the positional condition is a condition on a position of a supplier or a discharge destination of a sheet member in a process of forming an image on the sheet member, the plurality of specification targets are a plurality of images of a plurality of lamps lighting respectively on a plurality of sheet support portions that are candidates for the supplier or the discharge destination of the sheet member in the image forming apparatus, the integrated circuit distinguishes the plurality of images of the plurality of lamps from other images by identifying predetermined luminescent colors, and the processor determines the supplier or the discharge destination of the sheet member by selecting an image located in the visual line direction from among the plurality of images of the plurality of lamps.

* * * * *